July 10, 1956 — W. W. WESNER — 2,754,235
THERMAL INSULATING WALLBOARD
Filed March 10, 1954
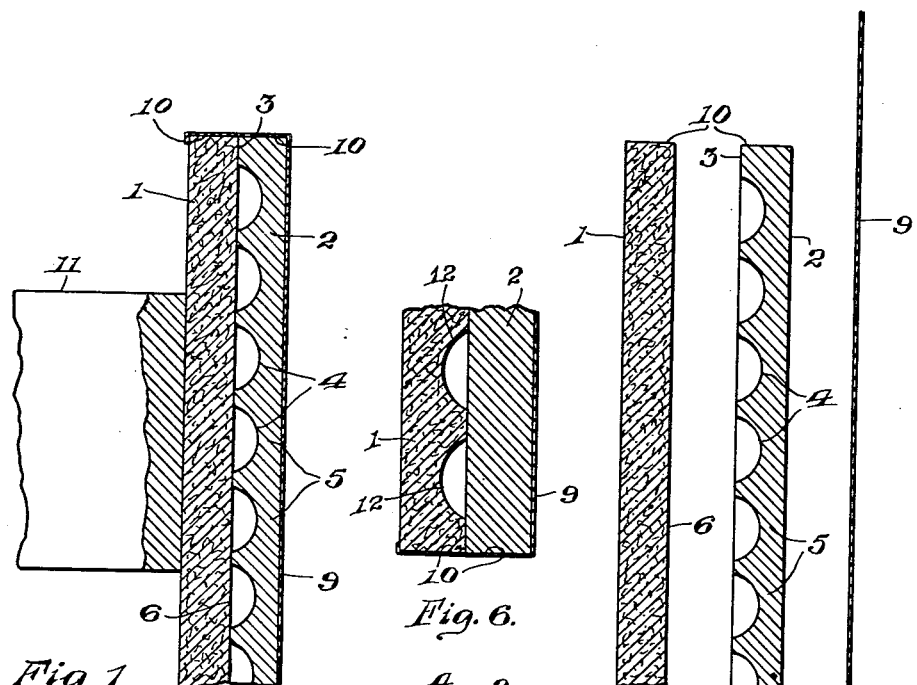
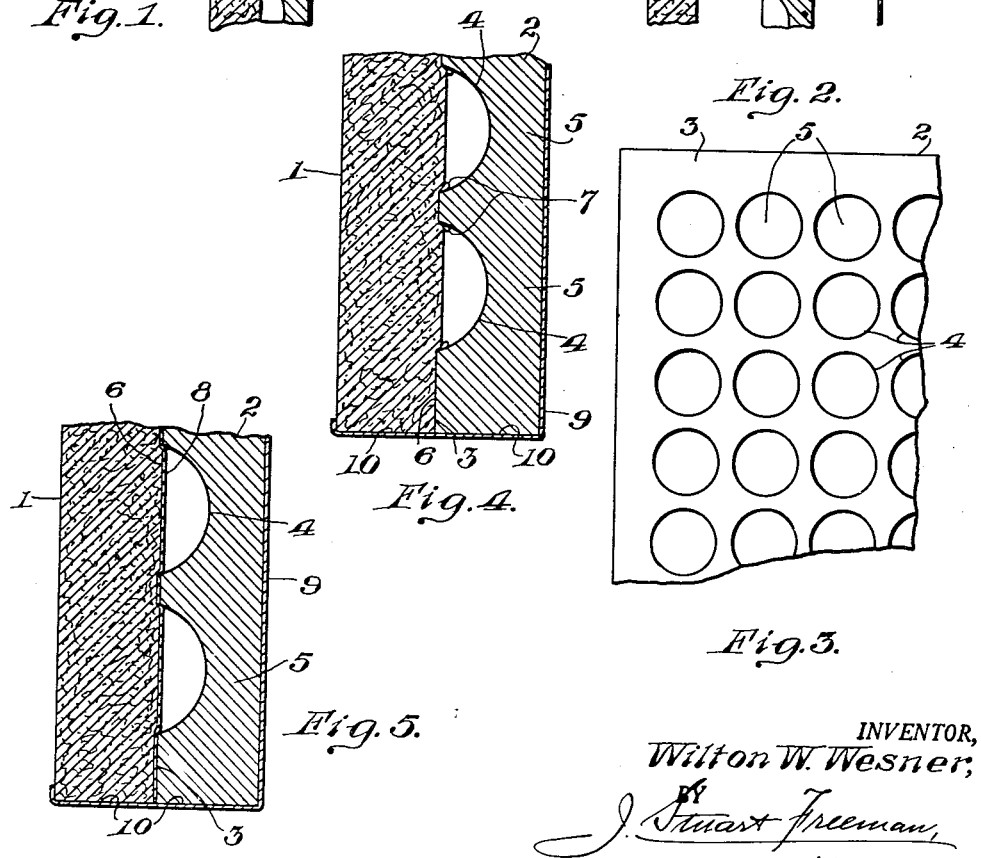

United States Patent Office 2,754,235
Patented July 10, 1956

2,754,235

THERMAL INSULATING WALLBOARD

Wilton W. Wesner, Rancocas, N. J.

Application March 10, 1954, Serial No. 415,210

4 Claims. (Cl. 154—45.9)

The object of the invention is to provide improvements in thermal insulation wallboard and the method of producing same.

Another object is to provide an improved wallboard that combines the peculiar cellular characteristics of certain existing substances or products, and those relatively homogeneous characteristics of certain other existing substances or products, but which improved product possesses higher efficiency and more desirable physical characteristics, than would be the obvious result of merely adding one loosely to the other.

A further and more specific object is to provide a composite wallboard consisting primarily of an initial plurality of layers, one of which is composed of the same or similar cellular material to that which is widely known as "Celotex" and the much more homogeneous gypsum material widely known as "Sheetrock," said initially separate layers being unitarily secured together in such manner that they combine to provide composite sheet material, capable of insulating to a high degree against the passage of heat and at the same time providing upon one side at least a surface, that is sufficiently fine grained and solid as to permit the attachment of extraneous objects to it, as by the use of nails, screws and the like, and at the same time effectively resist breakage, chipping, indentation and the like resulting from the impact of extraneous objects with it.

Still another object is to provide such a composite wallboard, having thermal insulating spaces between a major position of its adjacent layer surfaces, so as to thereby increase the thermal insulation characteristics of the finished product as a whole, above and beyond that which would result from merely adding together a plurality of the initially separate products above referred to.

And a still further object is to provide an improved method by which the above described new product is produced, which method consists in providing a sheet of relatively yielding cellular material, and a sheet of relatively solid fine-grained material such as gypsum having a major portion of one of its surfaces provided with recesses defined by marginal edges of abrupt angularity, interposing a cementitious substance between the adjacent surfaces of said sheets, and then firmly pressing said sheets together and embedding the relatively abbreviated plane surface of the second sheet in and beneath the plane of the adjacent surface of said first sheet, to thereby force a portion of the material of said first sheet sufficiently into the recesses of said second sheet, to cause material of said first sheet and the cementitious substance to grip those portions of the adjacent surface of said second sheet lying between said recesses.

With the objects thus briefly stated, the invention comprises further details which are hereinafter fully brought out in the following description, when read in conjunction with the accompanying drawings, in which Fig. 1 is a somewhat enlarged transverse section through a composite wallboard illustrating one embodiment of the invention;

Fig. 2 is what may be termed an "exploded" sectional view of the several board or sheet elements that enter into the manufacture of the improved product, when assembled as the initially separate elements before being united as shown in Fig. 1; Fig. 3 is a plan view of a fragmentary portion of one of the elements before its union with the other of said elements, to show the multiplicity of thermal insulating air spaces provided in one of its major surfaces prior to intimate unitary assembly; Fig. 4 is an enlarged fragmentary section showing how when the intervening cementitious adhesive flows partially from between the adjacent surfaces of two boards, it builds up and partially encloses and grips the angular edges of the more abbreviated surfaces of the gypsum board between neighboring air spaces or cells; Fig. 5 is a similar fragmentary section showing the use of a thin sheet of thermoplastic material between and securing together the adjacent surfaces of said boards; and Fig. 6 is a section similar to Fig. 4, but showing the dead-air spaces in the cellular sheet.

Referring to the drawings, there are initially provided the several elements shown in Figs. 1 and 2, which comprise a sheet or board 1 of highly cellular material, such as but not limited to that widely known product called "Celotex," and which is essentially composed of mascerated bagasse, dried cornstalks and similar raw materials or waste products, together with a second sheet or board 2 of fine-grained and relatively homogeneous gypsum or substantial equivalent, that is readily obtainable as so-called "Sheetrock." However, it is to be understood that any desired plurality of such boards may be used, instead of the two illustrated, as for example a central insulating sheet of the cellular material, protected upon its opposite side by surface boards of the gypsum or similar fine-grained, relatively homogeneous and less heat-insulative material.

In the production of the improved product, one surface 3 of a sheet of gypsum, which is here used as a generic term, is provided with a large number of substantially contiguous recesses 4, which in the final product entrap bodies of air that serve to heighten the thermal insulative characteristics of the finished product. These recesses may be of any desired number in a surface of a given area, and of any suitable shape both in plan and in axial cross section, but if possessed of the shape of a spherical segment will inherently have the weight or pressure-supporting characteristics of a simple spherical arch, with the result that, when desirable, the wall thickness at the center 5 of each such recess will have substantially the same pressure-supporting characteristics as would a substantially thicker cross section bounding a recess of elliptical cross section, for example.

Bearing in mind that there is a very considerable difference between the mass densities of the highly cellular and the less cellular sheets or boards, when a surface 6 of the first is firmly pressed against the recessed surface 3 of the second, the relatively abbreviated aggregate area of the latter can be readily forced appreciably into the former, so that an intervening coating of suitable cementitious adhesive 7 will perfectly function to secure said sheets or boards together in inseparable relation, especially if such adhesive is of sufficient volume that it flows around and thereby grips the abbreviated surface areas of the gypsum or the like, at the edges of said recesses, as shown in Fig. 4. Also, if instead of a liquid or semi-liquid adhesive or cement there is employed a thin intervening sheet 8 of cementitious thermosetting plastic, such thin sheet will serve to seal the porous surface of the cellular sheet against the escape therethrough of the air within said recesses, as such air tends to contract and expand under the influence of thermal variations, while at the same time gripping the abbreviated portions of the recessed surface 3 of the sheet 2.

After the two (or more) sheets or boards are firmly pressed together, a thin sheet of preferably non-porous paper or the like 9 is affixed by suitable adhesive to the outer exposed surface of the gypsum, and then folded about what may be termed the end or edge surfaces 10 of said boards, and additionally if desired at least a short distance across the opposite exposed surface of the cellular board, it being understood that this cover sheet does not actually project beyond the adjacent surfaces of said cellular and gypsum sheets, though it appears that way due to its having to be shown in exaggerated cross section.

The improved product herein described provides a distinct improvement over ordinary wallboard and insulation board when used independently, or merely when one is laid upon the other. In existing wallboards of the gypsum and similar types, there is relatively little thermal insulation afforded, while in modern buildings the demand for a higher degree of insulation is rapidly increasing, due to the rapid spread and adaptation of air conditioning, and the resultant need to keep excessively hot air outside during summer, and to maintain the warmer air of homes, factory and other business buildings inside during the winter, all towards a saving in the fuel consumption, greater comfort and higher efficiency. This new panel provides an inexpensive construction with a high insulation value, while being adapted for use either exteriorly or interiorly.

The provision of fully enclosed dead air spaces further prevents the passage of heat equally in one direction as in the opposite direction, so as to thereby keep outside a maximum degree of excessive and undesirable heat during the summer, and retain within the building a maximum of the fuel-produced heat during colder weather. The improved composite wallboard may obviously be installed in either position, that is, with the cellular sheet or board upon the outer or the inner side, but usually it is preferable within buildings to position such cellular element upon the outside or against the studding or rafters 11, so as to thereby present a relatively non-porous and much harder surface towards the inwardly exposed wall surfaces. By contrast, when used as sheathing upon the outside, the cellular element is preferably placed against the studding, so that the harder surface of the gypsum or its equivalent is made to stand the wear and tear of the natural elements. Thus, when upon the inside of an enclosed area the gypsum element can be plastered, painted, or otherwise treated, much better than could the much softer cellular element, while upon the exterior of a building the gypsum can be painted, stuccoed or similarly treated, better than the cellular element could ever be.

Whereas, "Celotex" and "Sheetrock" have been hereinbefore mentioned, plywood for example may be substituted for the latter, while any suitable cellular material such as airsetting froth and aerated plastics may be substituted for the former, wherefore reference to cellular boards composed principally of bagasse and the like, and non-porous boards of calcined gypsum, are at this time considered the most efficient materials of their respective types. Also, while any suitable glue, cement, or general binder such as asphaltum, tar and the like may be used to secure the two or more boards together, an adhesive based upon one or more of the recently improved silicones is to be preferred, since this particular class of binding substances penetrates and therefore clings more tenaciously to both the cellular material and to the less porous gypsum product, and at the same time tends to positively prevent the passage of dampness and humidity.

The shape (or shapes) of the recesses in the base material is not entirely critical, but it is essential that they present maximum aggregate volume consistent with structural strength. Also, referring to Fig. 6, a slight modification is shown in which the cellular sheet 1 is provided with the desired number, shape and arrangement of such dead-air spaces 12, rather than providing them in the base sheet of gypsum or the like, in which case the air-insulating characteristics or qualities of the cellular sheet remain substantially the same, while the base sheet is left stronger and less liable to fracture as nails, screws and similar fastening or securing means are made to penetrate it.

Having thus described my invention, what I claim and desire to protect by Letters Patent of the United States is:

1. A thermal-insulating unit, comprising a cellular fibrous insulating board and a gypsum laminated together in contacting relationship, the contacting surface of the gypsum board being provided with a series of separate recesses indented in said gypsum board and having substantially the shape of a three-dimensional segment, each segment serving to enclose a dead-air space between said boards.

2. A thermal-insulating unit in accordance with claim 1, characterized by the intervening substantially plane surface areas between said recesses being embedded in the contacting surface of said fiberboard.

3. A thermal-insulating unit in accordance with claim 1, wherein a plastic film is provided upon the contacting surface of said fiberboard.

4. A thermal-insulating unit in accordance with claim 2, wherein a plastic film is provided upon the contacting surface of said fiberboard.

References Cited in the file of this patent

UNITED STATES PATENTS

| | | |
|---|---|---|
| 1,172,710 | Howe | Feb. 22, 1916 |
| 1,446,177 | Hammes | Feb. 20, 1923 |
| 1,461,337 | Weiss | July 10, 1923 |
| 2,120,644 | Harper | June 14, 1938 |
| 2,128,549 | Zier | Aug. 30, 1938 |
| 2,384,686 | Kraus | Sept. 11, 1945 |
| 2,489,922 | Muench | Nov. 29, 1949 |

FOREIGN PATENTS

| | | |
|---|---|---|
| 46,938 | Netherlands | Oct. 16, 1939 |
| 163,515 | Austria | July 11, 1949 |